United States Patent [19]

Goto et al.

[11] 4,297,449
[45] Oct. 27, 1981

[54] PRODUCTION OF CROSSLINKED POLYMERS USING AN OXAZOLINE DERIVATIVE

[75] Inventors: Jugo Goto, Kawanishi; Takeo Saegusa, Kyoto, both of Japan

[73] Assignee: Takeda Chemical Industries, Ltd., Osaka, Japan

[21] Appl. No.: 147,543

[22] Filed: May 7, 1980

[30] Foreign Application Priority Data

May 15, 1979 [JP] Japan .................................. 54-60067

[51] Int. Cl.$^3$ ...................... C08F 8/00; C08F 222/04; C08F 222/06; C08F 222/08
[52] U.S. Cl. .................................. 525/329; 525/327; 525/375; 525/285
[58] Field of Search ........................ 525/327, 329, 375

[56] References Cited

U.S. PATENT DOCUMENTS

| | | | |
|---|---|---|---|
| 2,543,601 | 2/1951 | Rowland | 525/375 |
| 2,543,602 | 2/1951 | Rowland | 525/328 |
| 3,752,793 | 8/1973 | Arlt et al. | 260/78.5 T |
| 3,758,629 | 9/1973 | Thill | 525/375 |
| 3,935,138 | 1/1976 | Wingler et al. | 525/375 |

*Primary Examiner*—Carman J. Seccuro
*Attorney, Agent, or Firm*—Wenderoth, Lind & Ponack

[57] ABSTRACT

A process for producing a polymer having crosslinked structure, which comprises reacting a polymer having in the molecule a partial structure of the formula:

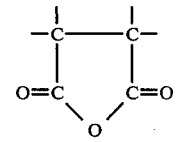

with an oxazoline derivative of the general formula:

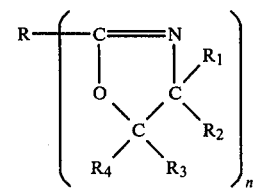

wherein n is an integer of 1 to 4; R is an n-valent aromatic hydrocarbon radical; $R_1$, $R_2$, $R_3$ and $R_4$ are respectively the same or different hydrogen or alkyls having not more than 3 carbon atoms.

The polymer shows an excellent adherence, and is of great industrial value as coatings, adhesives and molding materials with by far improved heat and solvent resistance.

11 Claims, No Drawings

PRODUCTION OF CROSSLINKED POLYMERS USING AN OXAZOLINE DERIVATIVE

This invention relates to a process for producing polymers having a new crosslinked structure.

Generally, polymers having no crosslinked structure, which can be used in solution form, or a fluid state by heating, are advantageous in some respects from a standpoint of the ease of processing and handling, while they are accompanied with such drawbacks as inferior solvent- and heat-resistance. It is, therefore, considered of significance to impart an appropriate degree of crosslinked structure to these crosslink-absent polymers whereby their physico-chemical properties can be improved.

With the purpose of ameliorating the drawbacks without losing the advantageous nature of the polymers, the present inventors carried out extensive investigation and completed this invention by employing a particular oxazoline derivative as the crosslinking agent.

Thus, this invention is concerned with a process for producing polymers having the new crosslinked structure, which comprises reacting a polymer having in the molecule a partial structure of the formula:

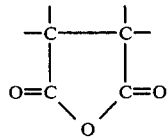

with an oxazoline derivative of the general formula:

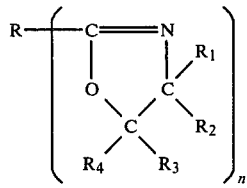

wherein n is an integer of 1 to 4;
R is an n-valent aromatic hydrocarbon radical;
$R_1$, $R_2$, $R_3$ and $R_4$ are the same or different, hydrogen or alkyls having not more than 3 carbon atoms.

The polymer having in the molecule a partial structure of the formula:

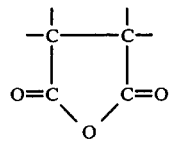

which is useful in this invention may be any type of polymers that have one or more of said partial structures in the main or side chain. Such polymers may be typically obtained by copolymerizing one or more of polymerizable vinyl monomers with an unsaturated carboxylic acid anhydride, for example, maleic anhydride, citraconic anhydride and itaconic anhydride in the manner conventional per se. Alternatively, they may be obtained by graft-polymerizing a linear, high-molecular-weight compound resulting from homopolymerization or copolymerization of one or more polymerizable vinyl monomers with an unsaturated carboxylic acid anhydride such as maleic anhydride, etc. and one or more polymerizable vinyl monomers.

The polymerizable vinyl monomer may be any type of monomers that are conventionally used; examples of the monomer which is suitably employed may include styrene, chlorostyrene, methylstyrene, ethylene, propylene, butadiene, vinylidene chloride, vinyl chloride, vinyl bromide, vinyl fluoride, vinyl acetate, vinyl propionate, methyl acrylate, ethyl acrylate, propyl acrylate, butyl acrylate, octyl acrylate, methyl methacrylate, ethyl methacrylate, butyl methacrylate, octyl methacrylate, acrylonitrile, vinylpyridine, methyl vinyl ether, ethyl vinyl ether, propyl vinyl ether, butyl vinyl ether, acrylamide, acrylic acid, methacrylic acid, maleic acid and itaconic acid, although they are not limited to these monomers.

The content of the partial structure of the formula:

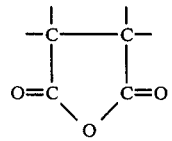

in the starting polymer is not specifically restricted, but is and preferably within the range of 0.5 to 50 weight %. In the event where an increased degree of crosslinking is desired for the resultant polymer having the crosslinked structure, the content of the group designated by said partial structure may be on the higher side, whereas such content can be on the lower side in the case where a high degree of crosslinking is not required. However, when the content of said partial structure in the polymer is less than 0.5%, the crosslinking effect, in some instances, fails to be exhibited.

The oxazoline derivative which is useful in this invention is a $\Delta^2$-oxazoline derivative having an aromatic substituent at the 2-position and is shown by the general formula described below:

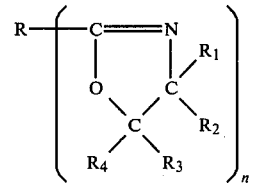

wherein R is an n-valent aromatic hydrocarbon radical; $R_1$ through $R_4$ are hydrogen or alkyls having not more than 3 carbon atoms; n is an integer of 1 to 4, preferably n is 2.

Specific examples of the compound of the above formula are described below:
2-Phenyl-$\Delta^2$-oxazoline
2-p-tolyl-$\Delta^2$-oxazoline
1,2-Bis-($\Delta^2$-oxazolinyl-2)benzene
1,3-Bis-($\Delta^2$-oxazolinyl-2)benzene
1,4-Bis-($\Delta^2$-oxazolinyl-2)benzene
1,2-Bis-($\Delta^2$-4-methyl-oxazolinyl-2)benzene
1,3-Bis-($\Delta^2$-4-methyl-oxazolinyl-2)benzene
1,4-Bis-($\Delta^2$-4-methyl-oxazolinyl-2)benzene 1,2-Bis-($\Delta^2$-5-ethyl-oxazolinyl-2)benzene
1,3-Bis-($\Delta^2$-5-methyl-oxazolinyl-2)benzene
1,3-Bis-($\Delta^2$-5-ethyl-oxazolinyl-2)benzene
1,4-Bis-($\Delta^2$-5-ethyl-oxazolinyl-2)benzene
1,2,4-Tris-($\Delta^2$-oxazolinyl-2)benzene
1,3,5-Tris-($\Delta^2$-oxazolinyl-2)benzene
1,2,4,5-Tetrakis-($\Delta^2$-oxazolinyl-2)benzene Among the above-mentioned compounds, bis-($\Delta^2$-oxazolinyl-2)benzenes are readily available and conveniently employable.

The reaction between a polymer having the above-described partial structure and an oxazoline derivative as mentioned above can be conducted as an optional ratio thereof, and is desirably such that the number of the oxazoline rings in the oxazoline derivative is about 1.5 to 3.0 for each one of said partial structures in the polymer, particularly in the case of a strong crosslinking being required.

When a 2-aromatic substituted $\Delta^2$-oxazoline compound is employed as a crosslinking agent, the reaction proceeds more gently as compared with the case with, for example, 2-aliphatic-substituted $\Delta^2$-oxazoline compound. In other words, the method according to this invention offers the advantages of a prolonged pot life and slight coloration brought about on the cured product.

The crosslinking is conducted at room temperature or under heating, and normally carried out at a temperature ranging from room temperature to 200° C., although it goes to completion within a shorter period of time, the higher the temperature is raised.

In cases in which the process according to this invention is applied to coatings and adhesives, an organic solvent may be employed, if necessary. As examples of the solvent which is usable, there may be mentioned methyl acetate, ethyl acetate, propyl acetate, butyl acetate, ethylene glycol acetate, tetrahydrofuran, dioxane, ethyl ether, acetone methyl ethyl ketone, methyl isobutyl ketone, cyclohexanone, benzene, toluene, xylene, dimethylformamide, dimethylacetamide, chloroform, carbon tetrachloride, methylene chloride, and the like.

Furthermore, an auxiliary agent, filler, leveling agent, surfactant, catalyst, pigment, dye, etc. may be added, if desired. In addition, maleic anhydride, succinic anhydride and the like may be added, as occasion demands.

The polymer obtained in this invention possesses an excellent adherence, and is of great industrial value as coatings, adhesives and molding materials with by far improved heat and solvent resistance.

For a further detailed explanation of this invention, the following Examples and Comparative Examples are given, wherein the term "part(s)" means "part(s) by weight" unless otherwise specified. The term "%" means "% by weight".

EXAMPLE 1

35 g of a 40% butyl acetate solution of the polymer comprising 1 part of maleic anhydride and 99 parts of vinyl chloride is mixed with 0.3 g of 1,3-bis-($\Delta^2$-oxazolinyl-2)benzene to make a solution. The pot life of the solution is found to be 5 days. The solution is applied on a glass plate with a brush. After 7 days, the varnish is in a slightly yellow gel form (Gardner Color 1; ASTM Designation D1544-68), while the coating film remains colorless and transparent. A drop of ethyl acetate is let fall on the coating film to observe its dissolving state; the coating film, though being swollen, is not found to be dissolved. For the purpose of comparison, the same procedure is conducted on the coating film applied without addition of an oxazoline compound, resulting in dissolution of the coating film.

EXAMPLE 2

30 g of a 20% toluene solution of the polymer prepared by grafting 2.2 parts of maleic anhydride and 2.8 parts of styrene to a copolymer of 30 parts of vinyl acetate and 70 parts of ethylene is mixed with 1,3-bis($\Delta^2$-oxazolinyl-2)benzene in the respective amounts indicated in Table 1 below to make seven test samples. By using each sample, glass plate and tin plate, and glass plate and aluminium foil are respectively caused to adhere with each other.

Seven days later, the respective materials are subjected to thermal-resistance test at the joint face and to friction pull test at 180°. The results are shown by Table 1 below.

TABLE 1

| Test No. | Added amount of 1,3-bis-($\Delta^2$-oxazolinyl-2) benzene, g | Pot life*, days | Peeling off temperature** (glass-tin plate) | Peeling off strength*** (glass-Al. foil) |
|---|---|---|---|---|
| 1 | — | >10 | 160° C. | 800g/2.5cm |
| 2 | 0.07 | 8 | >210° C. | 1100g/2.5cm |
| 3 | 0.14 | 5 | >210° C. | 1150g/2.5cm |
| 4 | 0.21 | 4 | >210° C. | 1200g/2.5cm |
| 5 | 0.28 | 3 | >210° C. | 1400g/2.5cm |
| 6 | 0.35 | 2 | >210° C. | 1100g/2.5cm |
| 7 | 0.42 | 2 | >210° C. | 1200g/2.5cm |

Remarks:
*The number of days required until the mixture ceases to be fluid.
**The temperature at which the adhesive softens and substrates are peeled off.
***180° peeling-off

EXAMPLE 3

0.22 g of 1,3-bis($\Delta^2$-oxazolinyl-2)benzene is dissolved in 14 g of an ethyl acetate-toluene mixed (ethyl acetate:toluene = 70:30) solvent solution (with a solid content of 50%) of the copolymer obtained by copolymerization of 70 parts of vinyl chloride, 30 parts of vinyl acetate and 1.5 parts of maleic anhydride, followed by applying the resultant solution with a brush to adhere glass to a tin plate. After 7 days, heat resistance test on the joint is carried out. The results are shown in Table 2.

TABLE 2

| No. | Method of adhesion | Peeling off temperature |
|---|---|---|
| 1 | Press-adhesion at room temperature | 140° C. |
| 2 | Press-adhesion at 100° C. for 5 min. | 150° C. |
| 3 | Press-adhesion at 140° C. for 5 min. | 140° C. |
| Control* 1 | Press-adhesion at room temperature | 110° C. |
| Control 2 | Press-adhesion at 100° C. for 5 min. | 110° C. |
| Control 3 | Press-adhesion at 140° C. for 5 min. | 110° C. |

Remarks:
*Without addition of 1,3-bis($\Delta^2$-oxazolinyl-2)benzene

EXAMPLE 4

In a glass tube 0.55 g of 1,3-bis($\Delta^2$-oxazolinyl-2)benzene is dissolved in 12.5 g of a toluene-butyl acetate-acetone (mixing ratio of 1:1:1) mixed solvent solution (with a solid content of 40%) of the linear copolymer obtained by copolymerizing 55 parts of styrene, 40 parts of butyl acrylate and 5 parts of maleic anhydride, and the solution is subjected to observation for any visible change. Reaction proceeds gradually, whereby there precipitates a small amount of gel-like material in the lower part, and the amount of gel-like material increases with the lapse of time. Seven days later, the polymer is found to present a gel form and precipitates in the lower layer, while the solvent forms the upper layer. The gel-like material, being insoluble in the solvent, is confirmed to be a crosslinked polymer.

EXAMPLE 5

0.3 g of 1,3-bis($\Delta^2$-5-methyl-oxazolinyl-2) benzene is dissolved in 14 g of a 50% ethyl acetate-toluene mixed (ethyl acetate:toluene=70:30) solvent solution of the polymer as employed in Example 3. The mixture is applied on an aluminium foil with a brush.

After the solvent is evaporated, the coating surface is, at 120° C. for 10 sec., pressed with a release paper on which a printing was previously applied with an ink, so that the printing is transferred on the surface of the aluminium foil.

Seven days later, delamination test is conducted by once pasting the printed surface of the aluminum foil with an adhesive cellophane tape and then peeling it off.

No delamination of the transferred ink is observed.

For the purpose of comparison, the same procedure is conducted on the coating film applied without addition of an oxazoline compound, resulting in complete delamination of the transferred ink.

COMPARATIVE EXAMPLE 1

0.15 g of 1.4-bis($\Delta^2$-oxazolinyl-2)butane is dissolved in 35 g of a 40% butyl acetate solution of the polymer as employed in Example 1. The mixture is applied on a glass plate with a brush. Seven days later, the varnish is found to turn brown and gel-like (Gardner Color>10), while the coating film becomes turbid and opaque, being far from capable of practical use. The varnish shows a pot life of about 1 day.

COMPARATIVE EXAMPLE 2

0.15 g of 2-ethyl-$\Delta^2$-oxazoline is dissolved in 35 g of a 40% butyl acetate solution of the polymer as employed in Example 1. The mixture is applied on a glass plate with a brush.

Seven days later, the varnish presents a dark brown appearance, while the coating film is yellow and slightly turbid.

What is claimed is:

1. A process for producing a polymer having a cross-linked structure, which comprises reacting a polymer having in its molecule a partial structure of the formula:

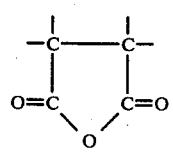

with an oxazoline derivative of the formula:

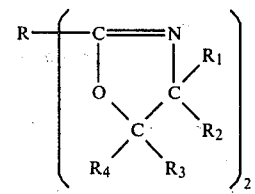

wherein R is a di-valent aromatic hydrocarbon radical, and $R_1$, $R_2$, $R_3$ and $R_4$, which may be the same or different, are hydrogen or alkyl having not more than 3 carbon atoms, the ratio of the number of the oxazoline rings in the oxazoline derivative relative to each one of the partial structures of the formula:

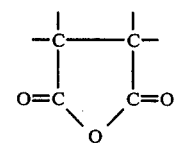

in the polymer being within the range of about 1.5 to 3.0.

2. A process as claimed in claim 1, wherein the content of the partial structure of the formula:

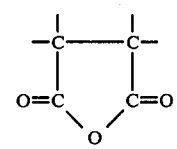

in the starting polymer is 0.5 to 50 weight %.

3. A process as claimed in claim 1, wherein the polymer having in its molecule a partial structure of the formula:

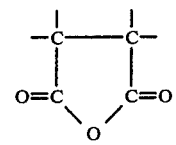

is a copolymer obtained by copolymerizing one or more polymerizable vinyl monomers with an unsaturated carboxylic acid anhydride.

4. A process as claimed in claim 1, wherein the polymer having in its molecule a partial structure of the formula:

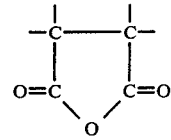

is a graft-copolymer obtained by graft-polymerizing a linear homopolymer or copolymer of one or more polymerizable vinyl monomers with an unsaturated carboxylic acid anhydride and one or more polymerizable vinyl monomers.

5. A process as claimed in claim 2, wherein the polymerizable vinyl monomer is vinyl chloride and the unsaturated carboxylic acid anhydride is maleic anhydride.

6. A process as claimed in claim 3, wherein the linear copolymer is a linear copolymer of vinyl acetate and ethylene, the unsaturated carboxylic acid anhydride is maleic anhydride and the polymerizable vinyl monomer is styrene.

7. A process as claimed in claim 2, wherein the polymerizable vinyl monomers are vinyl acetate and ethylene and the unsaturated carboxylic acid anhydride is maleic anhydride.

8. A process as claimed in claim 2, wherein the polymerizable vinyl monomers are styrene and butyl acrylate and the unsaturated carboxylic acid anhydride is maleic anhydride.

9. A process as claimed in claim 1, wherein the oxazoline derivative is 1,3-bis-($\Delta^2$-oxazolinyl-2)benzene.

10. A process as claimed in claim 1, wherein the oxazoline derivative is 1,3-bis-($\Delta^2$-5-methyl-oxazolinyl-2)benzene.

11. A crosslinked polymer as produced by the process of claim 1.

* * * * *